(12) United States Patent
Haboon et al.

(10) Patent No.: US 7,401,848 B2
(45) Date of Patent: Jul. 22, 2008

(54) ROTATABLE CAB WITH FLOOR-MOUNTED HEATING, VENTILATION AND AIR CONDITIONING

(75) Inventors: Tinoy Haboon, Garner, NC (US); Sidney Keith Scott, Kenly, NC (US); Matthew J. Harrenstein, Sanford, NC (US)

(73) Assignee: Caterpillar S.a.r.l., Geneva (CH)

( * ) Notice: Subject to any disclaimer, the term of this patent is extended or adjusted under 35 U.S.C. 154(b) by 222 days.

(21) Appl. No.: 11/315,004

(22) Filed: Dec. 23, 2005

(65) Prior Publication Data

US 2007/0145781 A1 Jun. 28, 2007

(51) Int. Cl.
*B60R 27/00* (2006.01)

(52) U.S. Cl. .............. 296/190.09; 296/190.08; 296/208

(58) Field of Classification Search ............ 296/190.08, 296/190.09, 208
See application file for complete search history.

(56) References Cited

U.S. PATENT DOCUMENTS

| 3,906,740 | A | 9/1975 | Thomas |
| 3,924,524 | A | 12/1975 | Whisler |
| 4,088,364 | A | 5/1978 | Termont |
| 4,097,085 | A | 6/1978 | Nelson |
| 4,427,090 | A | 1/1984 | Fredriksen et al. |
| 4,612,975 | A | 9/1986 | Ikari |
| 5,119,718 | A | 6/1992 | Wagner et al. |
| 5,273,340 | A | 12/1993 | Nelson et al. |
| 5,551,826 | A | 9/1996 | Todd et al. |
| 5,911,624 | A | 6/1999 | Stauffer |
| 6,102,471 | A | 8/2000 | Sasser et al. |
| 6,290,286 | B1 | 9/2001 | Murakami et al. |
| 6,398,294 | B1 | 6/2002 | Bollweg et al. |
| 6,450,284 | B1 | 9/2002 | Sakyo et al. |
| 6,874,589 | B1 | 4/2005 | Williams |
| 6,910,731 | B2 | 6/2005 | Albright et al. |
| 2003/0073400 | A1 | 4/2003 | Dahl et al. |

FOREIGN PATENT DOCUMENTS

| EP | 1 122 367 | 8/2001 |
| JP | 2001001742 | 1/2001 |

*Primary Examiner*—Lori L Lyjak
(74) *Attorney, Agent, or Firm*—Finnegan, Henderson, Farabow, Garrett & Dunner (57) ABSTRACT

A work machine includes a machine cab and a machine work body. The work body includes an HVAC unit mounted below a floor of the machine cab. The machine cab includes an HVAC duct system configured to move with the machine cab and seal with the HVAC unit of the work body.

20 Claims, 7 Drawing Sheets

ROTATABLE CAB WITH FLOOR-MOUNTED HEATING, VENTILATION AND AIR CONDITIONING

TECHNICAL FIELD

The present disclosure relates generally to a cab for a work machine, and more particularly, to an HVAC system and cab for a work machine.

BACKGROUND

In conventional work machines, such as skid steer loaders, the choice of location for the heating, ventilation and air conditioning ("HVAC") units poses a problem. The space required for such equipment makes placement difficult. In-cab mounting uses space otherwise available for the operator and detracts from overall machine aesthetics. Moreover, placing the HVAC unit far from the cab may cause increased losses in air temperature and velocity, requiring HVAC oversizing or decreased performance expectations. Proper sealing of the HVAC unit to the machine cab also may present challenges.

One method of mounting a work machine's HVAC system to a machine cab is described in U.S. Pat. No. 4,097,085 (the '085 patent) issued to Nelson. The '085 patent describes a tiltable cab having dual intake air conditioning mounted above the operator.

Although the system of the '085 patent may include a rotatable cab, it fails to provide maximum access to the work machine's HVAC system or other components by integrating the cab floor as well as part of the HVAC duct system to move with the machine cab during rotation. The disadvantages of this work machine configuration are that it may cause machine cab vibration and noise because of its location, it may hamper proper sealing of the cab for heating, air conditioning, and ventilation (HVAC), and may limit access of maintenance and service personnel to the machine body.

The disclosed system is directed to overcoming one or more of the problems set forth above.

SUMMARY OF THE INVENTION

In one aspect, the present disclosure is directed to a work machine including a machine cab and a machine work body, the work body includes an HVAC unit mounted below a floor of the machine cab. The machine cab includes an HVAC duct system configured to move with the machine cab and seal with the HVAC unit of the work body.

In another aspect, the present disclosure is directed to a skid steer loader, including a work body and a fully enclosed machine cab disposed adjacent the work body. The fully enclosed machine cab is configured to rotate relative to the work body. The machine cab includes an HVAC duct system configured to move with the machine cab and mate with at least one duct of the HVAC duct system coupled to the work body.

In another aspect, the present disclosure is directed to a method of conditioning air for a work machine having a cab and work body, including receiving conditioned air and fresh air through at least one duct integral with the cab, conditioning the air by an HVAC unit coupled to the work body beneath a floor of the cab, and supplying conditioned air to the cab through the at least one duct integral with the cab.

DETAILED DESCRIPTION

Figure 1:
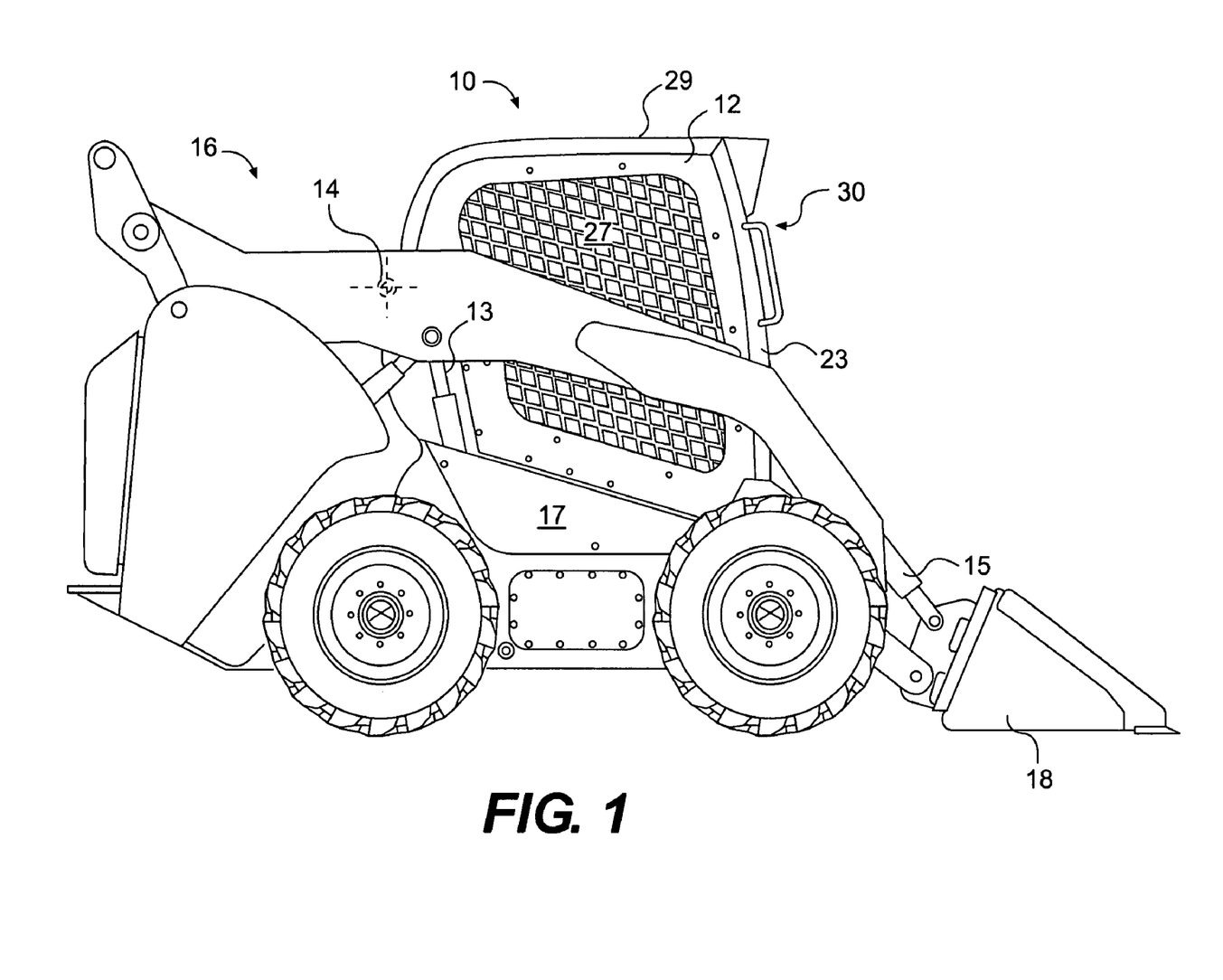
FIG. 1 is a side view of a work machine with an exemplary disclosed cab construction.

FIG. 1 illustrates an exemplary work machine 10 having multiple systems and components that cooperate to accomplish a task. Work machine 10 may embody a fixed or mobile machine that performs some type of operation associated with an industry such as mining, construction, farming, transportation, or any other industry known in the art. For example, work machine 10 may be an earth moving machine such as a skid steer loader, an excavator, a dozer, a loader, a backhoe, a motor grader, a dump truck, or any other earth moving machine. Work machine 10 may include a fully enclosed, rotatable machine cab 12 having side wall panels 27, a roof portion 29 and a front door 30, cab lift cylinders 13, a cab pivot axis 14, tilt cylinders 15, a work arm assembly 16, a work body 17, and a work tool 18.

Figure 2:
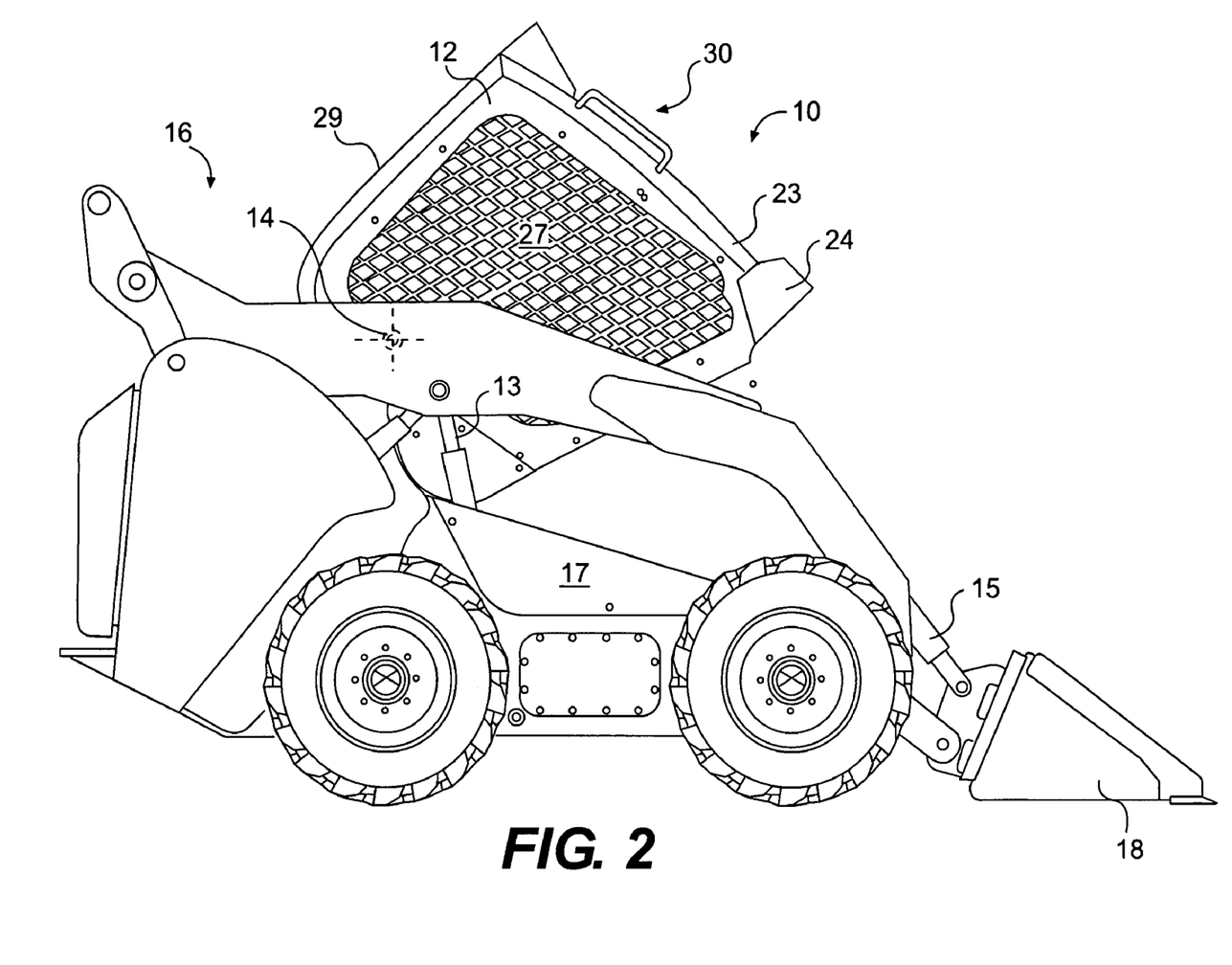
FIG. 2 is a side view of an exemplary disclosed rotated cab for the work machine of FIG. 1.

FIG. 2 illustrates work machine 10 in an open, rearwardly rotated position. The fully enclosed, rotatable machine cab 12 may be rotatably mounted to the work body 17 along pivot axis 14 using cab pivot mounts (not shown). The fully enclosed, rotatable machine cab 12 may utilize the cab lift cylinders 13 to move the machine cab 12 during rearward rotation. The lift cylinders 13 may be any type of lift cylinders, for example, hydraulic or pneumatic lift cylinders, and may be coupled between the work body 17 and machine cab 12 in any manner providing assistance in rotating the machine cab 12. Lift cylinders 13 are configured to facilitate the rearward rotation of machine cab 12 thereby exposing machine components disposed in work body 17 for easier access for maintenance purposes.

Figure 3:
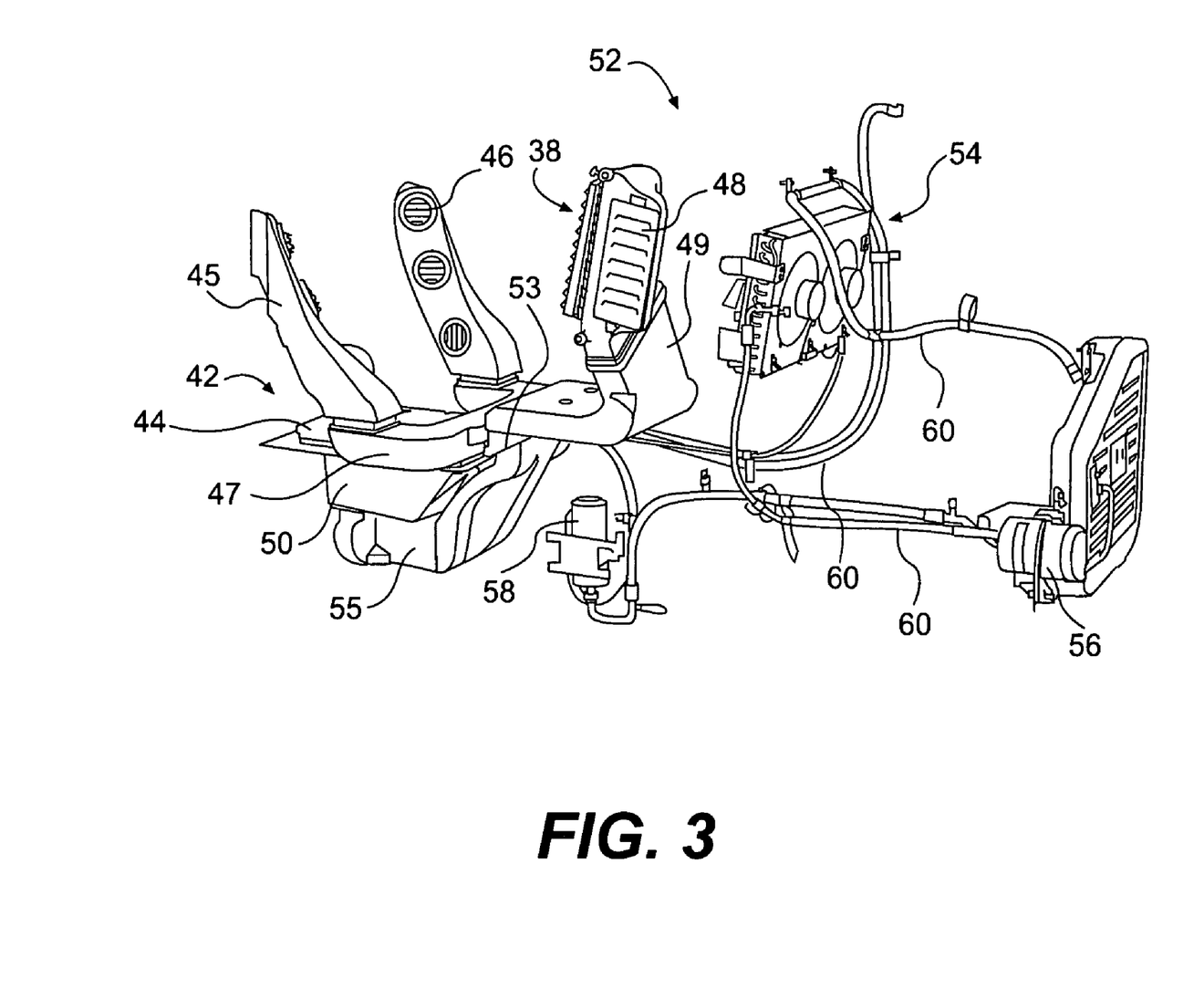
FIG. 3 is a perspective view of an HVAC system of the work machine of FIG. 1.

Referring to FIG. 3, an exemplary embodiment consistent with the disclosure includes an HVAC system 52 including an HVAC unit 50 and an HVAC main intake duct 55 mounted beneath the HVAC unit 50. HVAC unit 50 includes a blow fan, evaporator coil, and heater coil (not shown) which function together to blow and condition the incoming air from the HVAC main intake duct 55. The HVAC unit 50 is mounted beneath the floor plate 42 of the cab 12 and is configured to regulate the flow of air circulating within the HVAC system 52 at any given time. The HVAC unit 50 may be rigidly secured to work body 17 and may be fluidly connected to exit ducts 45 having exit vents 46 via an air distribution U-shaped duct member 47 which may be configured to seal against the floor plate 42 by way of a cushioning gasket 44 mounted to a top portion of floor plate 42 as shown. This configuration allows the floor plate 42 of the cab 12 to act as a top cover for the HVAC unit 50. The U-shaped duct member 47 may be mounted to the machine cab 12. As noted above, the HVAC unit 50, the HVAC main intake duct 55, and floor plate 42 may be securely mounted to and remain with the work body 17, even though the machine cab 12 with exit ducts 45, exit vents 46, and U-shaped duct member 47 rotates away from the work body 17 as shown in FIG. 2 to allow access for service personnel.

A recirculated air intake 38 may be fluidly connected to the HVAC main intake duct 55 via an intermediate air intake duct 49 and an intermediate seal 53. A fresh air intake 48 may be configured to be in fluid communication with recirculated air intake 38. The combination of the fresh are intake 48 and the recirculated air intake 38 may be configured to have an air intake ratio of 20 percent fresh air to 80 percent recirculated conditioned air. Thus, it is desirable to pull air for conditioning from both the machine cab 12 and the exterior of the work machine 10. In this manner, the HVAC system 52 recycles some conditioned air, thereby enhancing efficiency. Fresh air intake 48 may include an integral air filter (not shown). Intermediate air intake duct 49 may be configured to be securely mounted to machine cab 12 and thus separable from the HVAC main intake duct 55 when the machine cab 12 rotates to an opened position from the main body 17. Intermediate air intake duct 49 may reseal to the HVAC main intake duct 55 when the machine cab 12 is in the closed position. Similarly, the U-shaped duct member 47 mentioned above reseals to the floor plate 42 and cushioning gasket 44 when the machine cab 12 is in the closed position. HVAC system 52 further includes conventional parts such as a condenser 54, a compressor 56, an accumulator 58 and fluid conduits 60 mounted within the work body 17 in any conventional manner.

Incoming air, either conditioned or fresh, enters recirculated air intake 38 and fresh air intake 48, then the conditioned air travels through the intermediate air intake duct 49 past the intermediate seal 53 and into the HVAC main intake duct 55. Next, the air flows into and through the HVAC unit 50 for conditioning and for distribution to the U-shaped duct member 47. The conditioned air now flows from the U-shaped duct member 47 to exit ducts 45 and out exit vents 46 into the machine cab 12 where part of the conditioned air is recirculated via intake 38 and the process starts all over again.

Referring back to FIGS. 1 and 2, the fully enclosed, rotatable machine cab 12 may include a floor having the toe pan 24, a seat deck 22, and a rear wall portion 28, a support frame 23, side panels 27, front door 30, and roof portion 29. The front of the machine cab 12 terminates in the toe pan 24 which accommodates the operator's feet during operation. The toe pan 24 rotates with the rest of the fully enclosed rotatable machine cab 12. The rear wall portion 28 may include a storage box, a mounted radio, electrical box, and the like, and may be made of non-metallic material.

Figure 4:
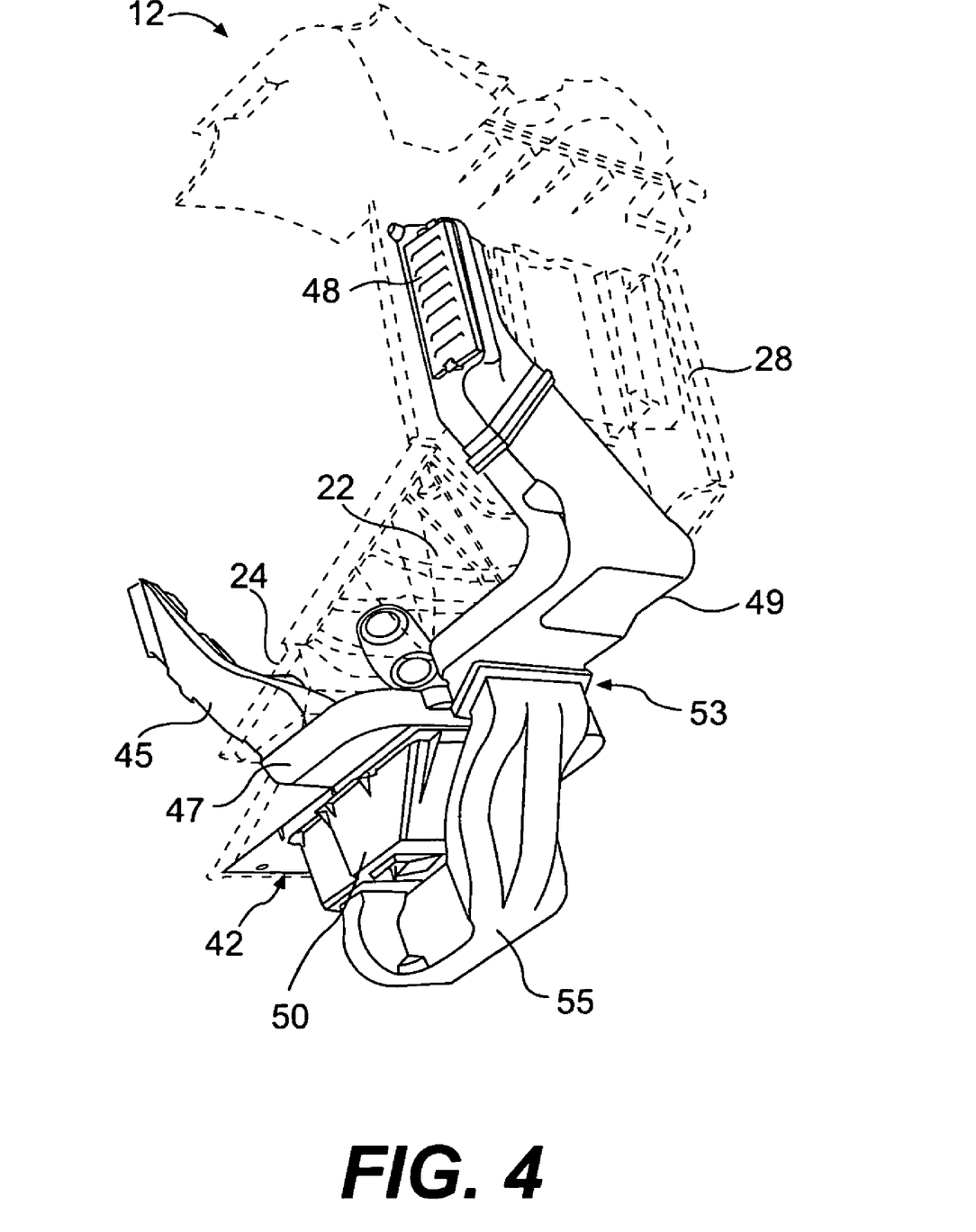
FIG. 4 is a perspective view of duct work for the HVAC system mounted beneath a cab floor of the work machine of FIG. 1.
Figure 5:
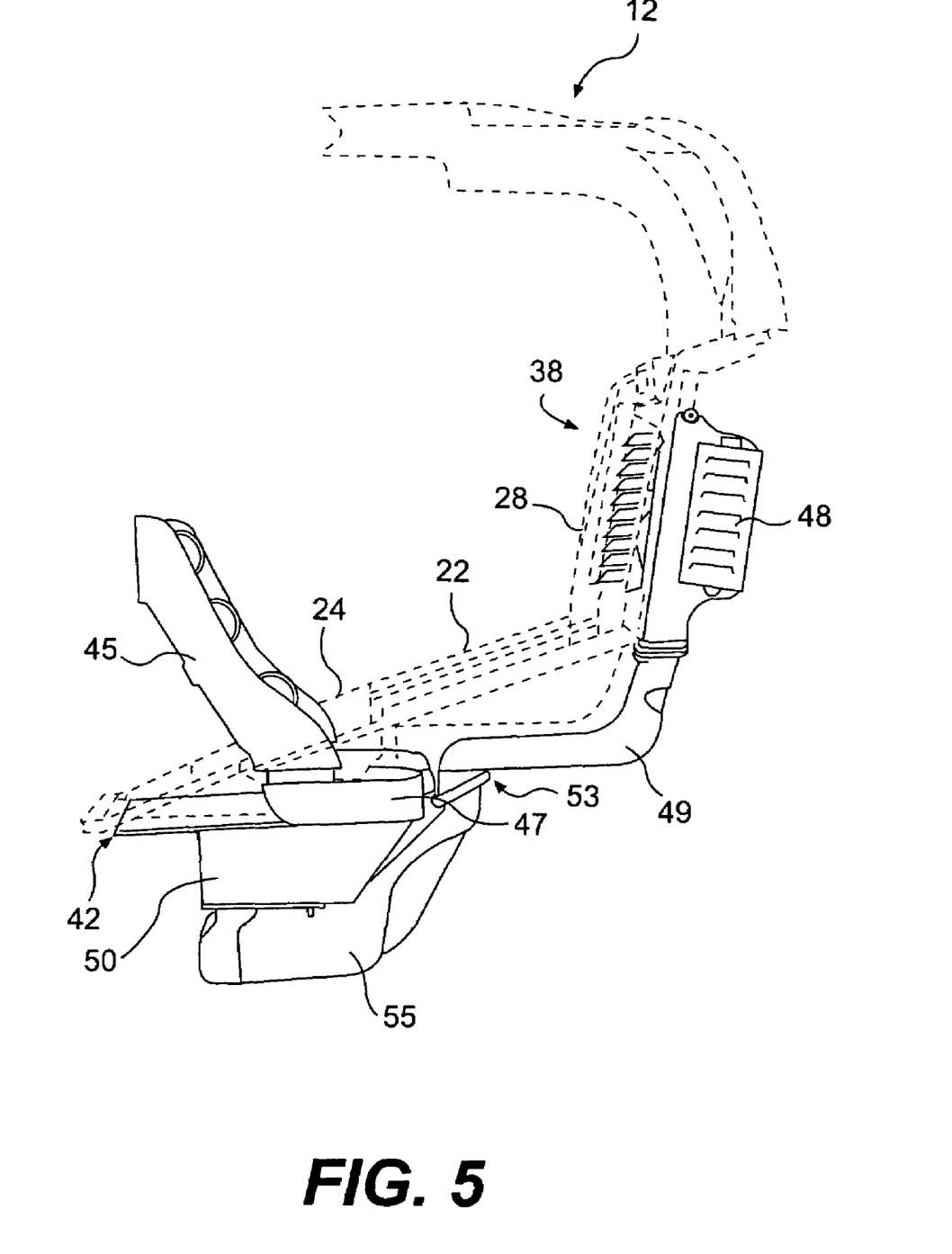
FIG. 5 is a side view of FIG. 4.

Referring to FIGS. 4 and 5, the HVAC unit 50 may be mounted beneath toe pan 24 as shown while having the intermediate air intake duct 49 detachably connected to HVAC main intake duct 55 via intermediate seal 53. The intermediate air intake duct 49 and U-shaped duct member 47 are configured to closely follow the contours of seat deck 22 and rear wall portion 28. In this exemplary configuration, the floor plate 42 serves two purposes: it supports a toe pan 24 and provides a side of the HVAC unit 50. Thus, the configuration eliminates a duplicative part, i.e., one side of the HVAC unit 50, creating cost savings.

During operation, the HVAC main intake duct 55 may be coupled to duct 49. Ducts 47, 49 are configured to deliver conditioned air and transmit fresh filtered air to the machine cab 12. As mentioned above, the HVAC system 52 may be configured to receive some air for conditioning from both the machine cab 12 and the exterior of the work machine 10. The ducts 47, 49 may be configured to rotate with the machine cab 12. In certain embodiments, the duct 47 may be configured to seal to the HVAC unit 50 via the cushioning gasket 44 and duct 49 may be configured to seal directly to the HVAC main intake duct 55 via the intermediate seal 53.

Figure 6:
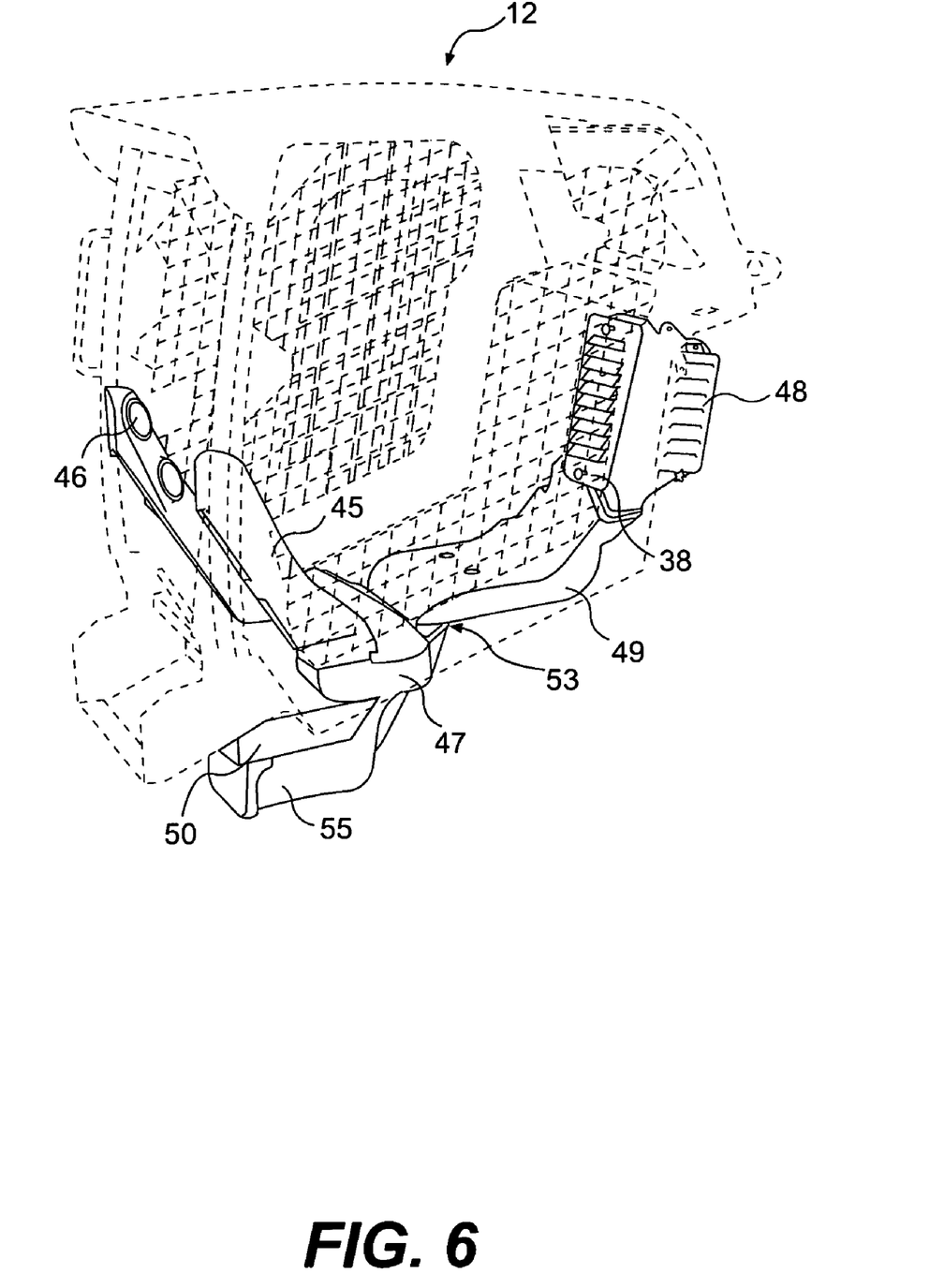
FIG. 6 is a perspective view in partial phantom of the HVAC system mounted in the cab of FIG. 1.

Referring to FIGS. 5 and 6, the HVAC unit 50 may be configured to sit directly beneath the machine cab 12 when in operation, thus, conditioned air does not travel far before entering the machine cab 12. Therefore, placing the HVAC unit 50 against the floor plate 42 may limit loss of air velocity and temperature. The exit ducts 45 for releasing conditioned air into the machine cab 12 may be configured to sit on the toe pan 24 of the work machine 10.

Figure 7:
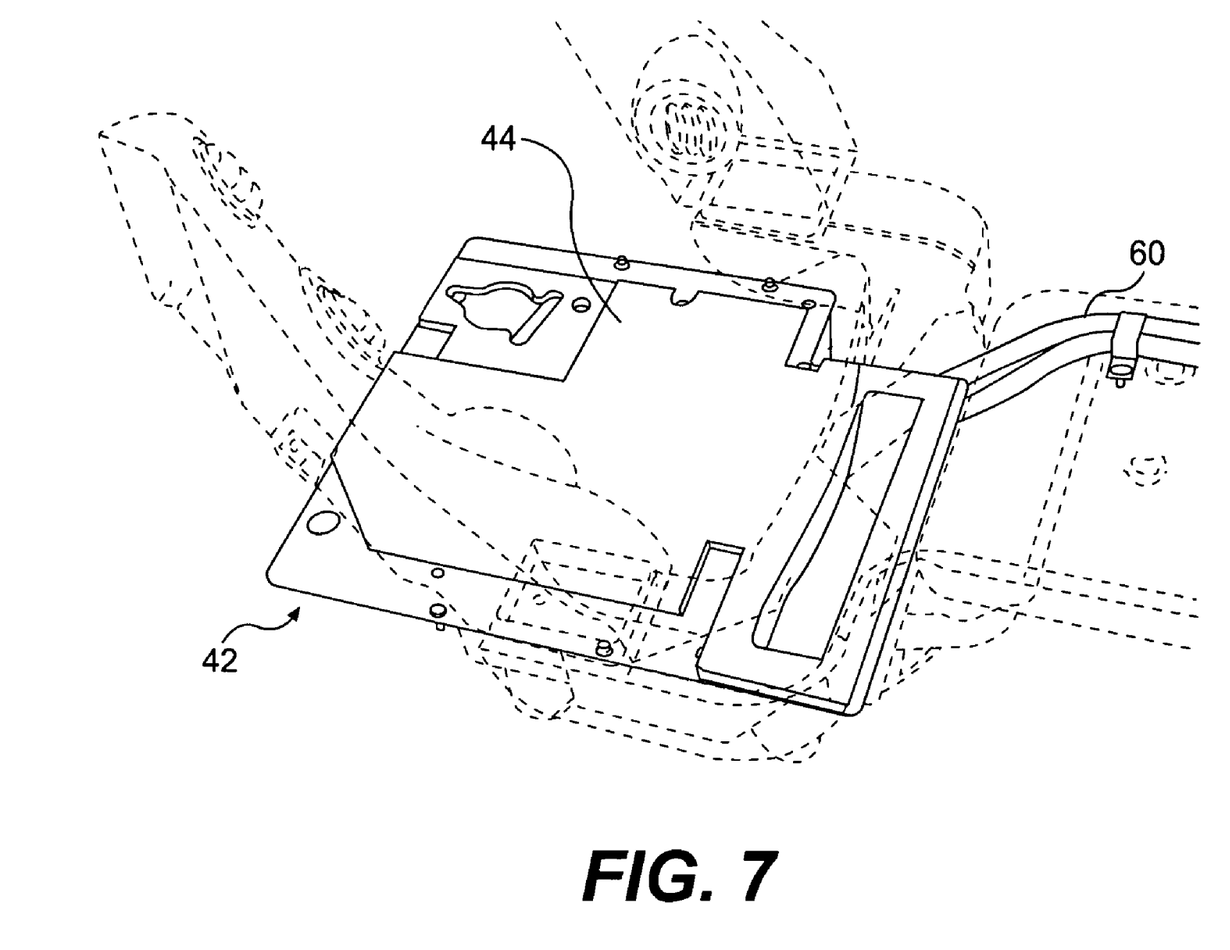
FIG. 7 is a perspective view in partial phantom of a cushioned floor plate gasket of the HVAC system of FIG. 5.

Referring to FIG. 7, the floor plate 42 may have the cushioning gasket 44, such as a sturdy foam mat on top of it. This cushioning gasket 44 dampens vibrations from the floor plate 42 associated with the operating HVAC system 52, helping to isolate the toe pan 24 that sits above the floor plate 42. Moreover, the cushioning gasket 44 creates a pad for service personnel to kneel on when performing maintenance work on the work machine 10. As mentioned above, in this exemplary configuration, the entire machine cab 12, including the toe pan 24 rotates out of the way of service personnel when accessing systems located within the work body 17.

The exemplary embodiment described above facilitates kitting (the introduction of after-market upgrades to the work machine 10). If a manufacturer includes duct work on all work machines 10, a work machine owner can add an HVAC system 52 by changing the floor plate 42 installed the work machine 10.

While the above description mentions an HVAC system 52 for inclusion in a work machine 10, such as a skid steer loader, the disclosure could have applications in other types of machinery or vehicles.

Alternatively, the fully enclosed rotatable machine cab 12 may by tilted rearward by an operator using a single tool (not shown). The machine cab 12 may be held in place by the lift cylinders 13 or by a conventional self-latching mechanism (not shown). When the cab is tilted back numerous components of the work machine 10 are accessible. For example, hydraulic pumps, hydraulic motors, engine valve lines and fuel tank of the work machine 10 are accessible for quicker, easier service when the cab is rotated to its open position.

INDUSTRIAL APPLICABILITY

The disclosed fully enclosed, rotatable machine cab 12 may be applicable to any work machine that includes a machine cab for an operator. The disclosed rotatable machine cab 12 may allow better access for maintenance personnel and improved HVAC sealing of the cab 12. The operation of the fully enclosed, rotatable machine cab 12 will now be explained.

During operation of work machine 10, the fully enclosed, rotatable machine cab 12 is in the closed position as shown in FIG. 1. The operator ingresses and egresses through the front door 30 as required or needed. The operator will sit on the seat positioned on seat deck 22 and will operate the work machine 10 by controlling the work arm assembly 16 and thereby the work tool 18. The operator may also place his or her feet within the toe pan 24 during work operations for safety. The operator may notice that the large front door 30 allows for better visibility of the work area.

The operator may need to control the air temperature within machine cab 12 and thereby activate the work machine's HVAC system 52 as needed. HVAC system 52 can be controlled to provide either warm or cool air depending on ambient conditions and the needs of the operator at any given time. The proximity of the HVAC system 52 to the machine cab 12 reduces travel distance of both intake fresh air and conditioned air to the machine cab 12. This configuration may help to reduce losses in air temperature and velocity thereby improving the overall efficiency of the HVAC system 52.

After exiting the work machine 10, the operator or other maintenance personnel may access components of the work machine by initiating machine cab lift cylinders 13 causing the fully enclosed, rotatable machine cab 12 to rotate in the rearward direction up and away from the work body 17 of the work machine 10. The HVAC system 52 is configured to have particular components rotate along with the machine cab 12, namely the ducts 47, 49 that are contoured with seat deck 22 and rear wall portion 28 while the main intake duct 55 and floor plate 42 remain with the work body 17. Thus, the systems and components of the work machine 10 are fully accessible for any required repairs or upkeep. Upon completion of repairs or maintenance the rotatable machine cab 12 is lowered back to its closed position and the operator may enter through the front door 30 and continue work operations.

Several advantages over the prior art may be associated with the fully enclosed, rotatable cab 12. The disclosed rotatable cab 12 may allow access for maintenance personnel allowing for the easy servicing of work machine systems; may further allow for a larger operator door 30 for easier ingress and egress, and improves sealing of the cab for heating, air conditioning, and ventilation purposes.

It will be apparent to those skilled in the art that various modifications and variations can be made to the disclosed fully enclosed rotatable cab. Other embodiments will be apparent to those skilled in the art from consideration of the specification and practice of the disclosed fully enclosed rotatable cab. It is intended that the specification and examples be considered as exemplary only, with a true scope being indicated by the following claims and their equivalents.

What is claimed is:

1. A machine, comprising:
   a machine cab and a machine body, the body including an HVAC unit mounted to the body below a floor of the machine cab, and the machine including an HVAC duct system configured to have components move with the machine cab and configured to seal to the HVAC unit of the body.

2. The machine of claim 1, wherein the HVAC unit includes a blower, heating coils, and cooling coils for moving and conditioning air.

3. The machine of claim 1, wherein the HVAC duct system includes:
   at least one air intake;
   an intermediate air intake duct connected to the at least one air intake;
   a main intake duct fluidly connected to the intermediate air intake duct;
   an air distribution duct fluidly connected to the main intake duct;
   at least one exit duct connected to the air distribution duct; and
   at least one exit vent disposed on the at least one exit duct for venting air into the machine cab.

4. The machine of claim 3, wherein the intermediate air intake duct is mounted to the machine cab and is configured to be separable from the main air intake duct upon relative movement between the machine cab and body.

5. The machine of claim 3, further including a floor plate having a gasket portion to act as a seal disposed between the HVAC unit and the air distribution duct.

6. The machine of claim 5, wherein the air distribution duct is mounted to the machine cab and is configured to be separable from the floor plate upon relative movement between the machine cab and body.

7. The machine of claim 5, wherein the HVAC unit, the floor plate, and the main intake duct are mounted to the body.

8. A skid steer loader, comprising:
   a body; and
   a fully enclosed machine cab disposed adjacent the work body and configured to rotate relative to the work body, the skid steer loader including an HVAC duct system mounted below a floor plate and configured to have components move with the machine cab and mate with at least one duct of the HVAC duct system coupled to the body.

9. The skid steer loader of claim 8, wherein the HVAC duct system includes:
   at least one air intake;
   an intermediate air intake duct connected to the at least one air intake;
   a main intake duct connected to the intermediate air intake duct;
   an air distribution duct fluidly connected to the HVAC unit;
   at least one exit duct connected to the air distribution duct; and
   at least one exit vent disposed on the at least one exit duct for venting air into the machine cab, wherein the HVAC unit includes a blower, heating coils, and cooling coils for moving and conditioning air.

10. The skid steer loader of claim 9, wherein the at least one air intake includes a fresh air intake portion and a conditioned air intake portion.

11. The skid steer loader of claim 9, wherein the floor plate has a gasket portion disposed between the HVAC unit and the air distribution duct.

12. The skid steer loader of claim 11, wherein the HVAC unit, the floor plate, and the main intake duct are mounted to the body.

13. The skid steer loader of claim 11, wherein the distribution duct is mounted to the machine cab and is configured to be separable from the floor plate upon relative movement between the machine cab and body.

14. The skid steer loader of claim 9, wherein the intermediate air intake duct is mounted to the machine cab and is configured to be separable from the main air intake duct upon rotation of the machine cab.

15. The skid steer loader of claim 13, wherein the distribution duct is configured to have at least two air distribution arms.

16. A method of conditioning air for a machine having a cab and a body, comprising:
   receiving conditioned air and fresh air through at least one duct integral with the cab;
   conditioning the air by an HVAC unit coupled to the body beneath a floor of the cab; and
   supplying conditioned air to the cab through the at least one duct integral with the cab.

17. The method of claim 16, wherein the HVAC unit includes a blower, heating coils, and cooling coils for moving and conditioning air.

18. The method of claim 16, the at least one duct integral with the cab includes:
   at least one air intake;
   an intermediate air intake duct connected to the at least one air intake;
   a main intake duct connected to the intermediate air intake duct;

an air distribution duct fluidly connected to the main intake duct;

at least one exit duct connected to the air distribution duct; and at least one exit vent disposed on the at least one exit duct for venting air into the cab.

19. The method of claim 18, wherein a floor plate having a gasket portion is disposed between the HVAC unit and the air distribution duct.

20. The method of claim 19, wherein the HVAC unit, the floor plate, and the main intake duct are mounted to the body.

* * * * *